UNITED STATES PATENT OFFICE.

HAROLD HIBBERT, OF WILMINGTON, DELAWARE, ASSIGNOR TO E. I. du PONT de NEMOURS POWDER COMPANY, OF WILMINGTON, DELAWARE, A CORPORATION OF NEW JERSEY.

METHOD OF CONDENSING POLYHYDRIC ALCOHOLS.

1,126,467. Specification of Letters Patent. Patented Jan. 26, 1915.

No Drawing. Application filed December 5, 1913. Serial No. 804,825.

*To all whom it may concern:*

Be it known that I, HAROLD HIBBERT, of Wilmington, in the county of Newcastle, and in the State of Delaware, have invented a certain new and useful Improvement in Methods of Condensing Polyhydric Alcohols, and do hereby declare that the following is a full, clear, and exact description thereof.

My invention relates particularly to a method for the condensation of alcohols containing a plurality of hydroxyl groups, and is applicable to the condensation of substances in general of this character. It has reference more particularly, however, to the condensation of liquid polyhydric alcohols.

The object of my invention is to effect the condensation of such compounds in a more rapid and economical way and to produce condensation products of this character having a high degree of purity.

My invention is capable of being carried out in many different ways, but for the purpose of illustration I shall refer to certain examples merely by way of illustration of my invention. My invention is capable of being carried out in connection with the condensation of glycerin so as to produce polymerized glycerin or polyglycerin. Hitherto, polymerized glycerin or polyglycerin has been produced by heating alone, but this method is very slow and the product obtained is quite impure. In order to accelerate the reaction certain alkalis have been used, especially caustic soda, and more recently it has been proposed to use various acetates for this purpose, especially sodium acetate. The product produced in the polymerization, which is probably largely diglycerol, is formed according to the following equation:

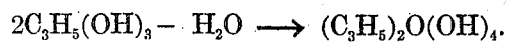

A certain amount of higher condensation products such as triglycerol and tetraglycerol are probably also formed. I have found, however, that the condensation of the compounds above referred to can be carried out in a particularly advantageous manner as, for example, in the case of glycerin, by heating glycerin with a small quantity of iodin. In the production of polymerized glycerin in accordance with my invention, the quantity of glycerin, preferably dynamite glycerin, is mixed with about 1/2000 of its weight of iodin, and is heated at preferably about 210° C. for several hours. Better results may be obtained if a slow stream of carbon dioxid is passed through the glycerin during the heating. The reaction may also be hastened by placing the glycerin under a reduced pressure. Furthermore, the combination of the two processes, namely, the passage of a slow stream of carbon dioxid into the liquid under reduced pressure, may also be employed. The amount of iodin used may be varied between wide limits, inasmuch as even an amount of iodin equal to 1/10000 of the weight of glycerin will effect considerable condensation and a larger quantity than 1/2000 effects the condensation more rapidly but at an increased cost for materials. During the heating, the water which is split off in the condensation is distilled off, together with a small amount of glycerin. The product remaining contains a substantial proportion of polyglycerins, the greater part of which is diglycerol. Under the same conditions and without the use of iodin, little or no condensation or polymerization takes place.

As another example of my invention, a glycol such, for example, as 1, 3-butylene glycol may be polymerized when heated with a small quantity of iodin, the iodin being preferably 1/200 of the weight of the glycol and the heating being preferably carried out for eight hours at about 130° C. The product remaining contains a considerable proportion of a polymerized glycol having a higher boiling point than the original butylene glycol. The polymerized product is polyglycol, and is probably a diglycol ether similar in constitution to the diglycerol above referred to.

While I have described my invention above in detail, I wish it to be understood that many changes may be made therein without departing from the spirit of my invention.

I claim:

1. The process which comprises condensing a polyhydric alcohol by bringing iodin into contact therewith, and heating the same.

2. The process which comprises condensing a polyhydric alcohol by bringing iodin into contact therewith, and heating the same under less than atmospheric pressure.

3. The process which comprises condensing a liquid polyhydric alcohol by bringing iodin into contact therewith, and heating the same.

4. The process which comprises condensing a liquid polyhydric alcohol by bringing iodin into contact therewith, and heating the same under less than atmospheric pressure.

5. The process which comprises condensing glycerin by bringing iodin into contact therewith, and heating the same.

6. The process which comprises condensing glycerin by bringing iodin into contact therewith, and heating the same under less than atmospheric pressure.

7. The process which comprises condensing glycerin by bringing 1/2000 of its weight of iodin into contact therewith, and heating the same.

8. The process which comprises condensing glycerin by bringing 1/2000 of its weight of iodin into contact therewith, and heating the same under less than atmospheric pressure.

9. The process which comprises condensing glycerin by bringing 1/2000 of its weight of iodin into contact therewith, and heating the same, while passing a current of carbon dioxid through the glycerin.

10. The process which comprises condensing glycerin by bringing 1/2000 of its weight of iodin into contact therewith, and heating the same under less than atmospheric pressure, while passing a current of carbon dioxid through the glycerin.

11. The process which comprises condensing glycerin by bringing a small quantity of iodin into contact therewith, and heating the same under less than atmospheric pressure while passing a current of carbon dioxid through the glycerin.

12. The process which comprises condensing a polyhydric alcohol by bringing a small percentage of iodin into contact therewith, and heating same.

13. The process which comprises condensing a polyhydric alcohol by bringing a small percentage of iodin into contact therewith, and heating the same under less than atmospheric pressure.

14. The process which comprises condensing a polyhydric alcohol by bringing a fraction of one per cent. of iodin into contact therewith, and heating the same.

15. The process which comprises condensing a polyhydric alcohol by bringing a fraction of one per cent. of iodin into contact therewith, and heating the same under less than atmospheric pressure.

16. The process which comprises condensing glycerin by bringing a fraction of one per cent. of iodin into contact therewith, and heating the same.

17. The process which comprises condensing glycerin by bringing a fraction of one per cent. of iodin into contact therewith, and heating the same under less than atmospheric pressure.

In testimony that I claim the foregoing I have hereunto set my hand.

HAROLD HIBBERT.

Witnesses:
L. BRODERICK,
V. G. LLOYD.